(12) United States Patent
Rudlaff

(10) Patent No.: US 7,267,481 B2
(45) Date of Patent: Sep. 11, 2007

(54) VEHICLE FLOOR TEMPERATURE SENSING FIXTURE

(75) Inventor: Joel Rudlaff, Marysville, OH (US)

(73) Assignee: Honda Motor Co., Ltd, Tokyo (JP)

( * ) Notice: Subject to any disclaimer, the term of this patent is extended or adjusted under 35 U.S.C. 154(b) by 99 days.

(21) Appl. No.: 11/218,177

(22) Filed: Sep. 1, 2005

(65) Prior Publication Data
US 2007/0047619 A1 Mar. 1, 2007

(51) Int. Cl.
*G01K 1/00* (2006.01)
(52) U.S. Cl. .................................. 374/208; 374/141
(58) Field of Classification Search .............. 374/208, 374/141; 33/503, 702, 704
See application file for complete search history.

(56) References Cited

U.S. PATENT DOCUMENTS

| | | | |
|---|---|---|---|
| 3,053,091 A | 9/1962 | Braunagel | |
| 3,282,107 A | 11/1966 | Ekstrom, Jr. | |
| 3,321,974 A | 5/1967 | Sterbutzel | |
| 3,573,995 A | 4/1971 | Senbokuya | |
| 3,751,305 A | 8/1973 | Huebscher | |
| 4,130,019 A | 12/1978 | Nitschke | |
| 4,242,148 A | 12/1980 | Remmert | |
| 4,265,117 A | 5/1981 | Thoma et al. | |
| 4,279,154 A | 7/1981 | Nakamura | |
| 4,355,911 A | 10/1982 | Tymkewicz | |
| 4,419,023 A | 12/1983 | Hager, Jr. | |
| 4,438,290 A | 3/1984 | Wells, Jr. et al. | |
| 4,441,827 A * | 4/1984 | Coderre | 374/153 |
| 4,558,959 A | 12/1985 | Thomas et al. | |
| 4,859,081 A | 8/1989 | Kabayashi | |
| 5,088,836 A | 2/1992 | Yamada et al. | |
| 5,195,826 A * | 3/1993 | Enderle et al. | 374/142 |
| 5,213,417 A | 5/1993 | Yamada et al. | |
| 5,281,793 A * | 1/1994 | Gavin et al. | 219/216 |
| 5,370,459 A | 12/1994 | Culbertson et al. | |
| 5,527,111 A | 6/1996 | Lysen et al. | |
| 5,618,109 A | 4/1997 | Culbertson | |
| 5,765,075 A | 6/1998 | Yamamoto | |
| 5,769,540 A | 6/1998 | Schietinger et al. | |
| 5,791,782 A | 8/1998 | Wooten et al. | |
| 5,868,496 A | 2/1999 | Spitzberg | |
| 6,267,018 B1 * | 7/2001 | Derr | 73/866.3 |
| 6,709,155 B2 | 3/2004 | Knittel et al. | |
| 6,738,722 B2 | 5/2004 | Polla et al. | |
| 2005/0166413 A1 * | 8/2005 | Crampton | 33/503 |

* cited by examiner

*Primary Examiner*—Diego Gutierrez
*Assistant Examiner*—Megann E Vaughn
(74) *Attorney, Agent, or Firm*—Christen Millard; Eley Law Firm Co.

(57) ABSTRACT

A fixture for sensing temperature. The fixture comprises a base, a generally horizontal member having a first distal end and a second distal end, the first end being connected to the base, a generally vertical member having a first distal end and a second distal end, the first end being connected to the second end of the horizontal member, a foot-shaped structure having an upper portion, a lower portion and a side portion, the upper portion being connected to the second end of the vertical member, and at least one temperature sensor affixed to the foot-shaped structure. The base is placed onto a seat and the foot-shaped structure is positioned proximate a floor, effective to position the sensor for sensing the temperature of the floor.

23 Claims, 4 Drawing Sheets

VEHICLE FLOOR TEMPERATURE SENSING FIXTURE

FIELD

The present invention relates generally to test fixtures. In particular, the present invention relates to a test fixture for sensing the temperature of a floor of a vehicle.

BACKGROUND

During the design of a vehicle various components, such as exhaust systems, are routed in accordance with design needs and the space available. If these components are sufficiently close to the floor of the vehicle, heat generated by the components can be transferred to the floor and consequently radiated into the interior of the vehicle. This heat may cause discomfort to the occupants of the vehicle. It is thus desirable to be able to sense the temperature of the floor in the interior of the vehicle to determine whether the temperature will be acceptable, to optimize the location and routing of heat-generating components, and to measure the impact of vehicle design changes on the temperature of the floor.

However, it is difficult to accurately sense the temperature of the floor. There are inherent variations in thermal coupling between temperature sensors and floor materials such as carpet and mats, the thermal coupling being dependent upon the amount of pressure applied to the sensors to press them into contact with the floor. For example, if a temperature measurement is made without pressing the temperature sensors into firm contact with the floor, the resulting measurement will be lower than the temperature perceived by an occupant whose foot is pressed firmly against the floor. Conversely, applying a force greater than that typical of a human foot will result in a measured temperature that is higher than the temperature that would be perceived by the occupant.

Weights may be employed to press temperature sensors into contact with vehicle flooring. However, using weights such as sandbags results in erroneous temperature measurements because of their relatively large area of weight distribution as compared to a human foot, causing variations in the amount of pressure applied to the distributed temperature sensors. Further, the weights tend to insulate underlying floor area, causing measurement error. There is a need for a fixture to position temperature sensors proximate the floor of a vehicle in a manner generally simulating that of a human foot in order to obtain temperature measurements that relate to the temperature perceived by an occupant of the vehicle.

SUMMARY

The disclosed invention provides at least one temperature sensor affixed to the underside of a structure having the general shape of a human foot. One or more weights are attached to a vertically-oriented member that is connected to the foot-shaped structure. A generally horizontally-oriented telescopic link is interposed between the vertically oriented member and a base. In operation, the base is placed on a seat of the vehicle. The telescopic link is adjusted, as needed, to position the foot-shaped structure apart from the seat and on the floor. The fixture is positioned such that the temperature sensors are urged into confronting contact with the surface of the floor by the weights, providing the proper thermal coupling for temperature measurements representative of temperatures that would be perceived by a human foot.

An aspect of the present invention is a fixture for sensing temperature. The fixture comprises a base, a generally horizontal member having a first distal end and a second distal end, the first end being connected to the base, a generally vertical member having a first distal end and a second distal end, the first end being connected to the second end of the horizontal member, a foot-shaped structure having an upper portion, a lower portion and a side portion, the upper portion being connected to the second end of the vertical member, and at least one temperature sensor affixed to the foot-shaped structure. The base is placed onto a seat and the foot-shaped structure is positioned proximate a floor, effective to position the sensor for sensing the temperature of the floor.

Another aspect of the present invention is a fixture for sensing temperature. The fixture comprises a base, a generally horizontal telescoping extension having a first distal end and a second distal end, the first end being pivotally connected to the base, a generally vertical member having a first distal end and a second distal end, the first end being pivotally connected to the second end of the horizontal member, a weight connected to the vertical member, a foot-shaped structure having an upper portion, a lower portion and a side portion, the upper portion being pivotally and slidably connected to the second end of the vertical member, and at least one temperature sensor affixed to the foot-shaped structure. The base is placed onto a seat and the foot-shaped structure is positioned proximate a floor, effective to position the at least one sensor for sensing the temperature of the floor.

Yet another aspect of the present invention is a method for sensing temperature. The method comprises the steps of providing a base, connecting a first distal end of a generally horizontal member to the base, connecting a first distal end of a generally vertical member to a second distal end of the horizontal member, connecting an upper portion of a foot-shaped structure to a second distal end of the vertical member, affixing at least one temperature sensor to the foot-shaped structure, and placing the base onto a seat and positioning the foot-shaped structure proximate a floor, effective to position the at least one sensor for sensing the temperature of the floor.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
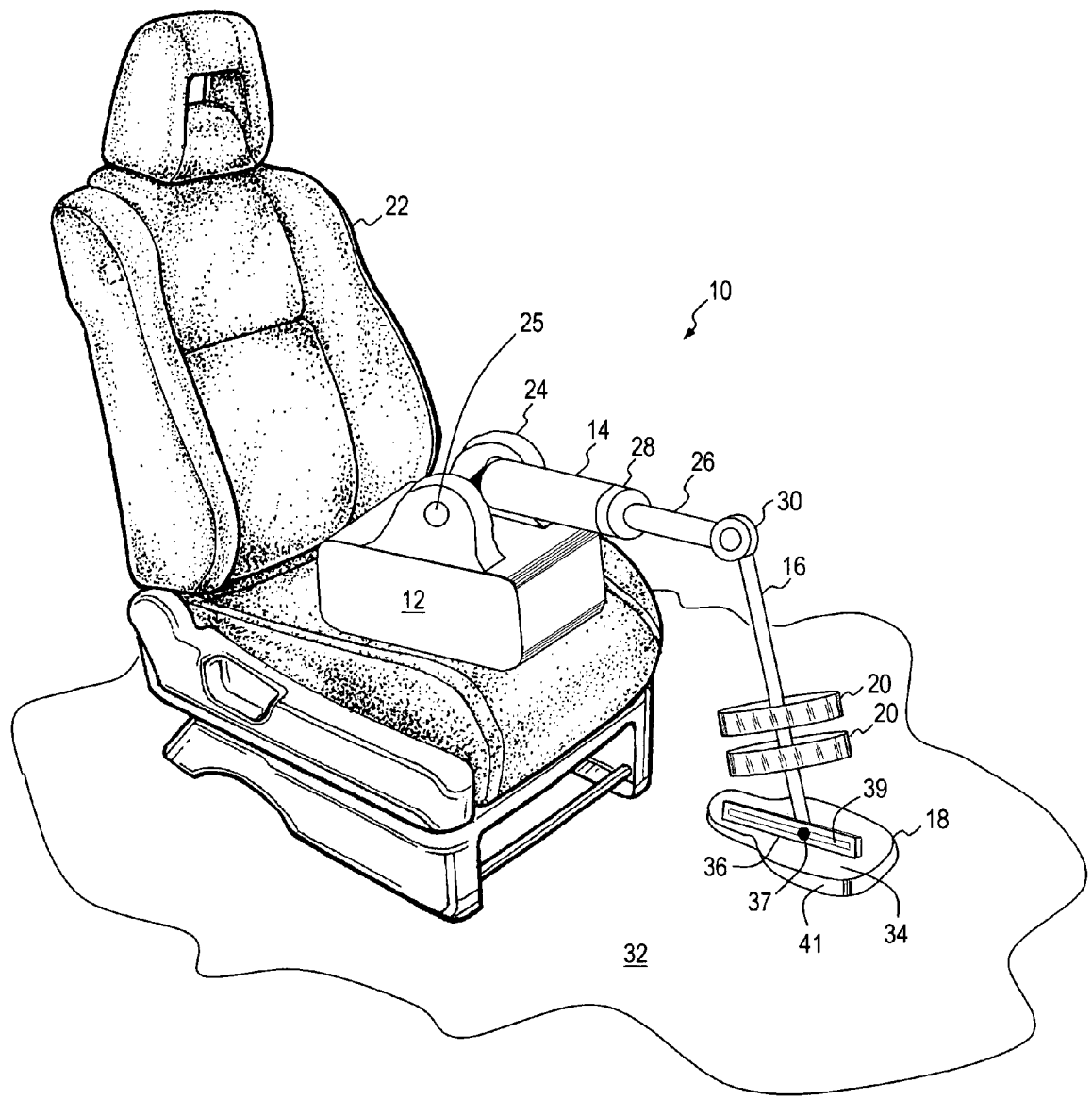
FIG. 1 is a perspective view of a temperature sensing fixture according to an embodiment of the present invention.
Figure 2:
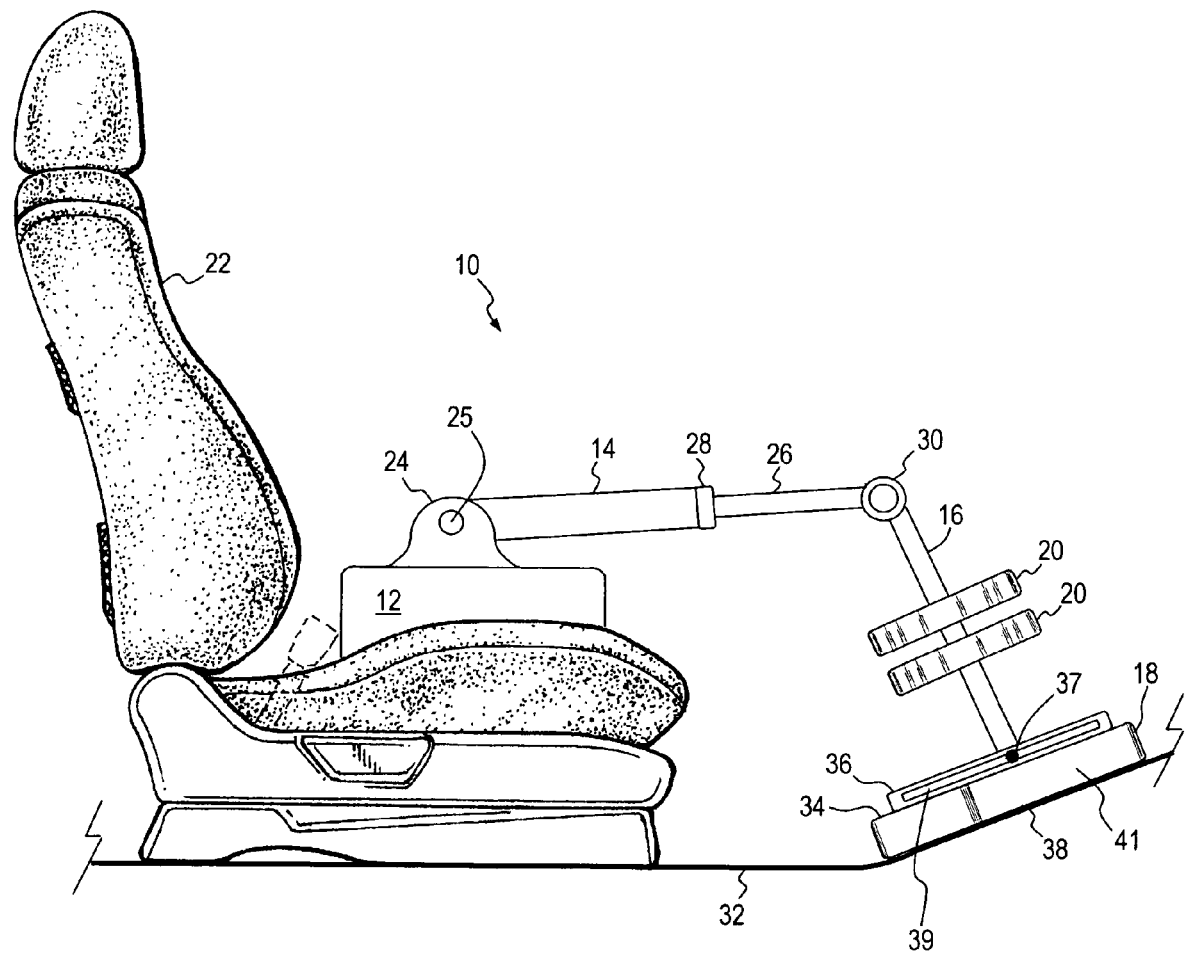
FIG. 2 is an elevational view of the temperature sensing fixture of FIG. 1.

A temperature sensing fixture 10 according to an embodiment of the present invention is depicted in FIGS. 1 and 2. Fixture 10 includes a base 12, a generally horizontal member 14, a generally vertical member 16, a foot-shaped structure 18, and weights 20.

Base 12 is sized and shaped to fit and rest upon a vehicle seat 22, and is sufficiently weighted to provide a stable platform for fixture 10. Base 12 may be made from a solid material such as wood, metal, composites and/or plastic. Alternatively, base 12 may be a framework or a housing containing a weighting material, such as stones, ceramics, steel and/or lead. In one embodiment base 12 may be at least partially covered with a resilient material such as leather or fabric to prevent damage to seat 22. A pair of projections 24 facilitate connection of horizontal member 14 to base 12 with a fastener such as a headed bolt or screw 25 inserted through adjacent openings in the projections and the horizontal member.

A generally horizontal longitudinal member 14 has a first distal end and a second distal end. The first end may be rigidly connected to base 12, or may be pivotably connected to projections 24. Other types of pivoting connections may also be employed, such as a swiveling pivot joint or a hinge interposed between base 12 and horizontal member 14. Horizontal member 14 may also include a telescoping section 26 that is adjustably slidable into and out of the horizontal member. Telescoping section 26 facilitates adjustment of foot-shaped structure 18 generally toward and away from seat 22. A releasable clamping or locking element 28 selectably allows telescoping section 26 to be longitudinally adjusted in relation to horizontal member 14, then retained in a desired position. Locking element 28 may be a cam-type lock, locking lever, compression fitting or screw. Horizontal member 14 may be made of any suitable material including, without limitation, wood, metal, plastics and composites, either separately or in any combination. Horizontal member 14 may be cylindrical, or may be any other desired longitudinal shape, such as rectangular-shaped members.

A generally vertical longitudinal member 16 has a first distal end and a second distal end. The first end may be rigidly connected to the second end of the horizontal member, or may be pivotably connected by a joint 30, allowing vertical member 16 to articulate. Although not shown in FIGS. 1 and 2, one skilled in the art will recognize that a telescoping section and locking element similar to telescoping section 26 and locking element 28 may be added to vertical member 16 to allow for vertical adjustment of foot-shaped structure 18 toward and away from a floor 32. Vertical member 16 may be made of any suitable material including, without limitation, wood, metal, plastics and composites, either separately or in any combination. Vertical member 16 may be cylindrical, or may be any other longitudinal shape, such as rectangular-shaped members.

Figure 3:
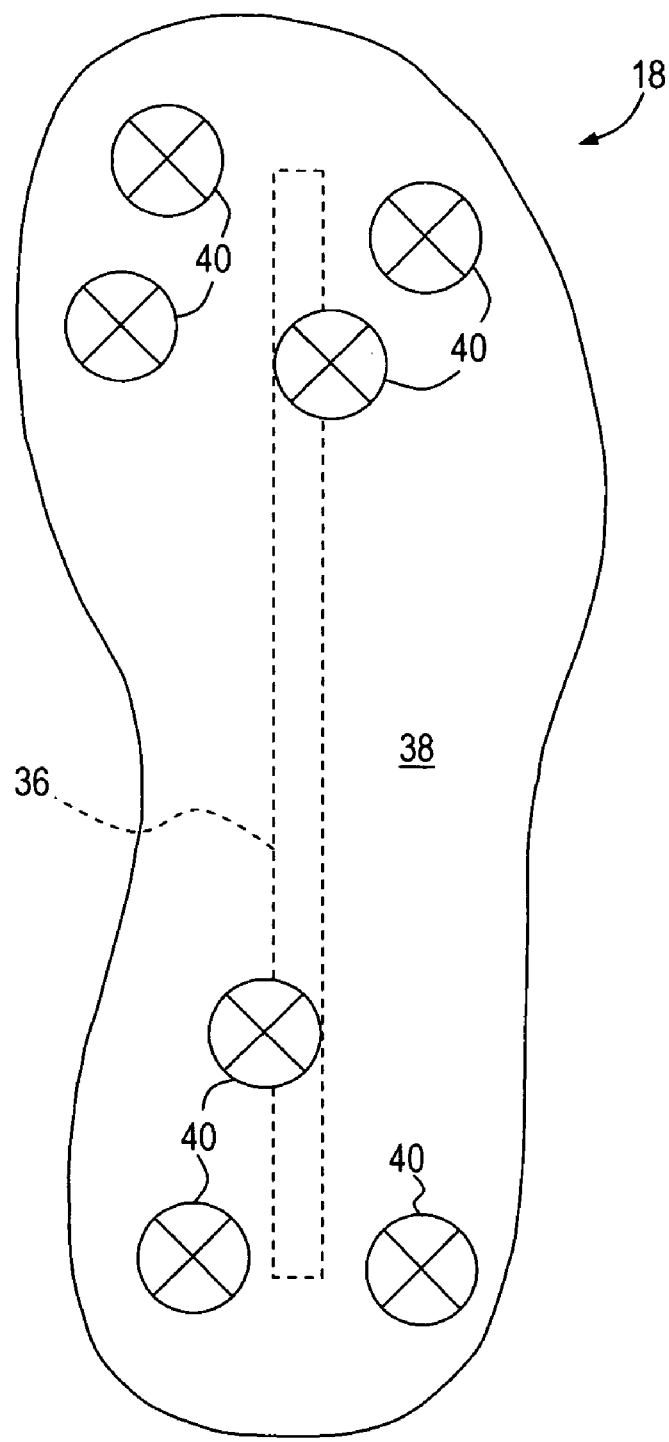
FIG. 3 is a bottom plan view of a foot-shaped structure.
Figure 4:
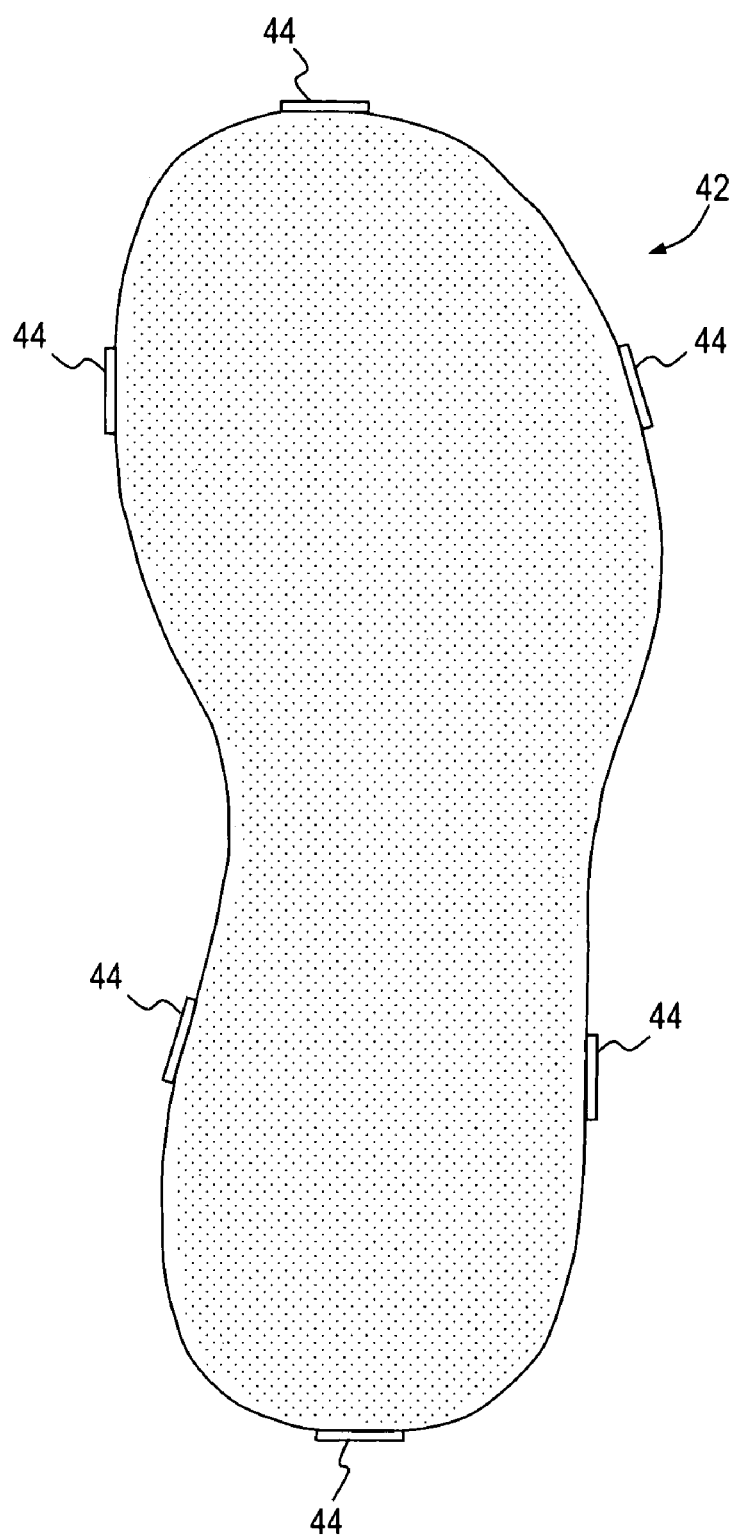
FIG. 4 is a bottom plan view of a cover for the foot-shaped structure of FIG. 3.

A generally foot-shaped structure 18, shown in FIGS. 1-3, is connected to the second end of vertical member 16 at an upper portion 34 of the structure. Structure 18 may be rigidly attached to vertical member 16, or may be made pivotable with a pivot 36. In one embodiment pivot 36 may be a slotted member and a pivot pin, as shown best in FIG. 2. In this embodiment the shaft of a conventional pin or fastener 37, such as a headed. screw or bolt, is inserted through a slot 39 and opening (not shown) in the second end of vertical member 16. Fastener 37 is releasably secured to vertical member 16 by a threaded portion of the vertical member or a nut, allowing foot-shaped structure 18 to be released, moved toward or away from seat 22 by moving the structure along slot 39. Foot-shaped structure 18 may be rotated about pivot 36 as needed to generally conform to a tilted or angled floor 32. Fastener 37 is then secured to hold foot-shaped structure 18 in position. Foot-structure 18 may be made of any suitable material including, without limitation, plastics, metals and composites.

A lower portion 38 of foot-shaped structure 18, shown best in FIG. 3, includes at least one temperature sensor 40 affixed to the lower portion such that the temperature sensor is oriented generally toward floor 32. At least one temperature sensor 40 may optionally be affixed to a side portion 41 (see FIGS. 1 and 2) of foot-shaped structure 18. Temperature sensor 40 may be any conventional sensor including, without limitation, a thermocouple, thermistor, resistance temperature detector ("RTD") or semiconductor temperature sensor. A plurality of sensors 40 are preferably employed and positioned on lower portion 38 such that the sensors simulate typical contact points between a human foot and the vehicle floor, such as the heel, portions of the sole, and the toes.

With reference to FIGS. 1 and 2, one or more weights 20 may be attached to vertical member 16. Weights 20 are attached in any conventional manner, such as with clips, clamps, screws and retainers (not shown). Weights 20 may be made of any suitable material, including metals such as steel, iron and/or lead. In addition, weights 20 may be made to be selectively movable to various positions along the longitudinal axis of vertical member 16 and secured in order to adjust the characteristics of the pressure exerted by foot-shaped structure 18, such as the distribution of the force exerted upon floor 32 by the structure. Weight 20 may also be varied by replacing the weight with a heavier or lighter weight, or adding or subtracting a plurality of weights from vertical member 16.

With reference to FIGS. 1-3, in operation, test fixture 10 is set up by placing base 10 onto seat 22. Foot-shaped structure 18 is positioned at a desired location away from seat 22 by appropriate adjustment of telescoping extension 26 and/or slot 39 of the foot-shaped structure. Horizontal member 14 is pivoted about projections 24 and pivot pin 25, vertical member 16 is pivoted about joint 30, and foot-shaped structure 18 is rotated about pivot 36 to position the foot-shaped structure generally parallel to floor 32. One or more weights 20 are attached to vertical member 20 to exert a predetermined force on the foot-shaped structure, calculated to generally simulate the force exerted on floor 32 by a human foot. Temperature sensors 40 are connected to any conventional temperature measurement and/or recording device (not shown), allowing a user to measure and quantify the temperature of the interior floor of a vehicle as may be perceived by a driver and/or passenger.

In other embodiments of the present invention a cover 42 may be placed over lower portion 38 of foot-shaped structure 18. Cover 42 may be made of any material such as plastic, leather and synthetic or natural rubber with a thickness suitable for simulating the insulative and thermal properties of various types of footwear worn by drivers and passengers of a vehicle. Cover 42 may be attached to foot-shaped structure 18 by one or more conventional fasteners 44 including, without limitation, clips, clamps, snaps, ties, adhesives, hook-and-loop. In operation, cover 42 serves to simulate the sole of various types of footwear, allowing for measurement of the temperature of floor 32 that may be perceived by a vehicle occupant wearing various types of footwear.

While this invention has been shown and described with respect to a detailed embodiment thereof, it will be understood by those skilled in the art that changes in form and detail thereof may be made without departing from the scope of the claims of the invention.

What is claim is:

1. A fixture for sensing temperature, comprising:
   a base;

a generally horizontal member having a first distal end and a second distal end, the first end being connected to the base;

a generally vertical member having a first distal end and a second distal end, the first end being connected to the second end of the horizontal member;

a weight connected to the vertical member;

a foot-shaped structure having an upper portion, a lower portion and a side portion, the upper portion being connected to the second end of the vertical member; and at least one temperature sensor affixed to the foot-shaped structure, the temperature sensor being located on at least the lower portion of the foot-shaped structure to simulate, in conjunction with the weight, a contact point and pressure between a human foot and the floor, wherein the base is placed onto a seat and the foot-shaped structure is positioned proximate a floor, effective to position the sensor for sensing the temperature of the floor.

2. The fixture of claim 1 wherein the horizontal member is pivotally connected to the base.

3. The fixture of claim 1 wherein the horizontal member further includes a telescoping extension.

4. The fixture of claim 3, further including a locking element to releasably secure the telescoping extension to the horizontal member.

5. The fixture of claim 1 wherein the vertical member further includes a telescoping extension.

6. The fixture of claim 5, further including a locking element to releasably secure the telescoping extension to the vertical member.

7. The fixture of claim 1 wherein the vertical member is pivotally connected to the horizontal member.

8. The fixture of claim 1 wherein the weight is at least one of selectively movable longitudinally along the vertical member and removably connected to the vertical member.

9. The fixture of claim 1 wherein the foot-shaped structure is pivotally connected to the vertical member.

10. The fixture of claim 9 wherein the foot-shaped structure is further slidably connected to the vertical member.

11. The fixture of claim 1 wherein the at least one temperature sensor is a thermocouple.

12. The fixture of claim 1, further comprising a cover removably attached to the lower portion of the foot-shaped structure.

13. The fixture of claim 1 wherein at least one temperature sensor is additionally located on the side portion of the foot-shaped structure.

14. A fixture for sensing temperature, comprising:

a base;

a generally horizontal telescoping extension having a first distal end and a second distal end, the first end being pivotally connected to the base;

a generally vertical member having a first distal end and a second distal end, the first end being pivotally connected to the second end of the horizontal member;

a weight connected to the vertical member;

a foot-shaped structure having an upper portion, a lower portion and a side portion, the upper portion being pivotally and slidably connected to the second end of the vertical member; and at least one temperature sensor affixed to the foot-shaped structure, the temperature sensor being located on at least the lower portion of the foot-shaped structure to simulate, in conjunction with the weight, a contact point and pressure between a human foot and the floor, wherein the base is placed onto a seat and the foot-shaped structure is positioned proximate a floor, effective to position the at least one sensor for sensing the temperature of the floor.

15. The fixture of claim 14 wherein the at least one temperature sensor is a thermocouple.

16. The fixture of claim 14 wherein the weight is at least one of selectively movable longitudinally along the vertical member and removably connected to the vertical member.

17. The fixture of claim 14 wherein at least one temperature sensor is additionally located on the side portion of the foot-shaped structure.

18. A method for sensing temperature, comprising the steps of:

providing a base;

connecting a first distal end of a generally horizontal member to the base;

connecting a first distal end of a generally vertical member to a second distal end of the horizontal member;

connecting an upper portion of a foot-shaped structure to a second distal end of the vertical member;

affixing at least one temperature sensor to the foot-shaped structure; and placing the base onto a seat and positioning the foot-shaped structure proximate a floor, effective to position the at least one sensor for sensing the temperature of the floor.

19. The method of claim 18, further comprising the step of pivotally connecting the horizontal member to the base.

20. The method of claim 18, further comprising the step of adding a telescoping extension to the horizontal member.

21. The method of claim 18, further comprising the step of pivotally connecting the vertical member to the horizontal member.

22. The method of claim 18, further comprising the step of connecting a weight to the vertical member.

23. The method of claim 18, further comprising the step of pivotably and slidably connecting the foot-shaped structure to the vertical member.

* * * * *